Feb. 4, 1969 M. VINET 3,425,408
TRACK SWITCH HEATER
Filed Dec. 18, 1967
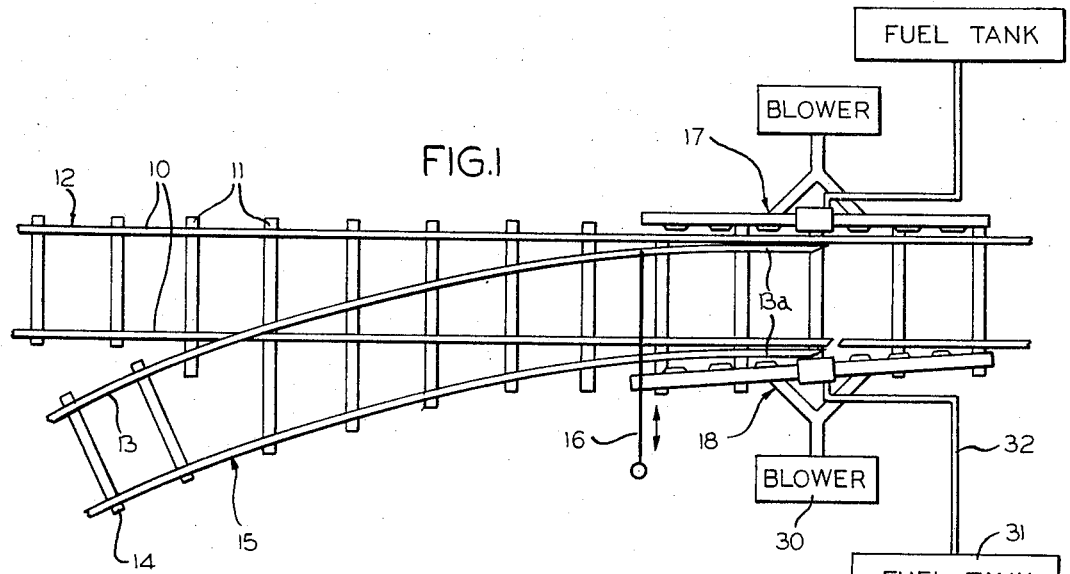
FIG.1
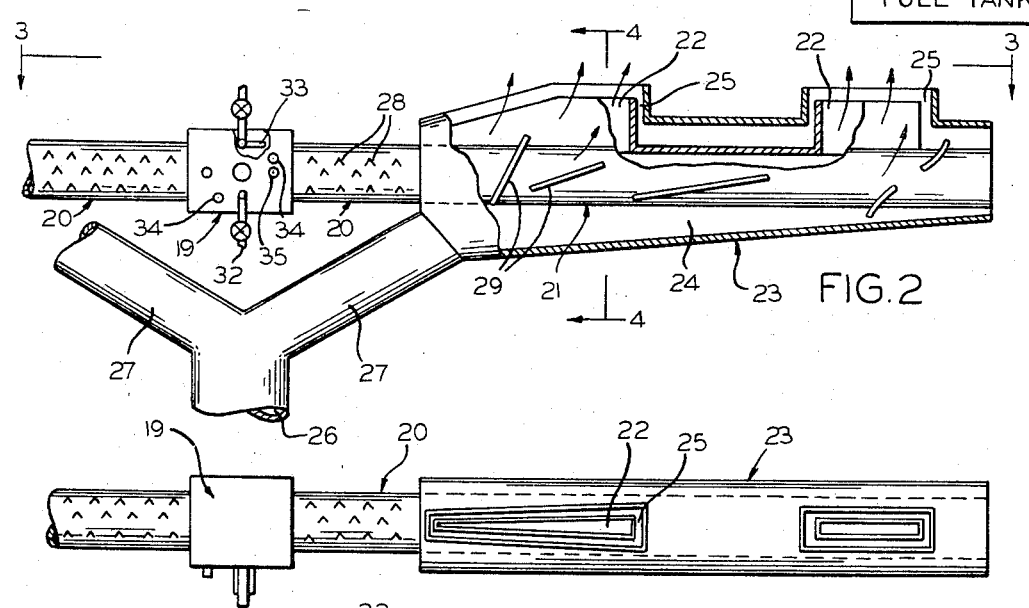
FIG.2
FIG.3
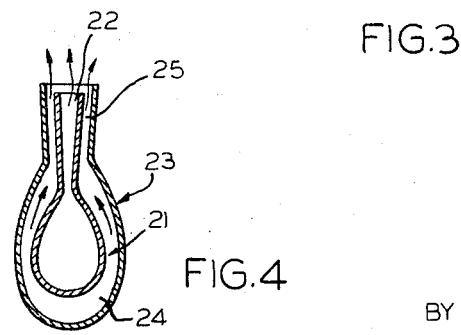
FIG.4
INVENTOR
MARIUS VINET
BY
ATTORNEY

United States Patent Office 3,425,408
Patented Feb. 4, 1969

3,425,408
TRACK SWITCH HEATER
Marius Vinet, Montreal, Quebec, Canada, assignor to Vapor Corporation, Chicago, Ill., a corporation of Delaware
Filed Dec. 18, 1967, Ser. No. 691,516
U.S. Cl. 126—271.2                8 Claims
Int. Cl. F23c 5/00

ABSTRACT OF THE DISCLOSURE

Track switch heater for generating and applying heat to track rails at track switches to remove snow and ice and maintain the switches in operative condition.

---

This invention relates in general to a heater for heating track switches to clear them of snow and ice, and more particularly to a track switch heater capable of keeping a track switch clear of snow and ice during all weather conditions.

Heretofore, difficulty has been encountered by railroads during certain weather conditions in maintaining track switches operative. Ice and/or snow caused by inclement weather will freeze and render inoperative track switches, thereby causing interruption of train schedules and the necessity of providing manual labor to thaw the switches and place them back in operation. These conditions have been costly to railroad operation.

The track switch heater of the present invention is adapted to be mounted directly on track ties adjacent track rails in switching areas to generate and direct high velocity hot air and gases against the track rails and thereby melt any snow or ice accumulations or maintain the switch free from snow or ice accumulations. This results in maintaining the switch in operative condition at all times. The heater of the invention includes controls that may be remotely or locally manipulated for firing the heater, or automatically operated upon the detection of ice and/or snow. A precombustion chamber sets up initial combustion of the fuel and delivers the combustion gases to nozzles that in turn direct the gases against the track rails. A plenum chamber is provided in surrounding relation to the gas nozzles and also defining air nozzles. High velocity ambient air is supplied to the plenum chamber which, upon being expelled through the air nozzles, induces the expelling of the gases from the gas nozzles and also causes a mixture of air and gases to impinge against the track rails. The high velocity ambient air also induces the introduction of the primary combustion air into the precombustion chamber. Because of the high velocity of the gases and air being expelled onto the track rails, the heater will effectively operate during windy or very cold weather conditions or in all weather conditions. The track heater is compact in size and capable of providing a high heat output relative to the power requirements.

It is therefore an object of the present invention to provide a track switch heater that is compact and adapted to be mounted on track ties adjacent track rails for supplying heat at specified locations during windy or very cold weather with a minimum of power supply and a maximum of thermal output to maintain the track switches clear of ice and snow.

Another object of this invention is in the provision of a track switch heater for generating and delivering to track rails a very hot mixture of air and gas at a high velocity that is capable of overcoming maximum wind velocity for clearing the track rails of inclement weather conditions.

Other objects, features and advantages of the invention will be apparent from the following detailed disclosure, taken in conjunction with the accompanying sheet of drawing, wherein like reference numerals refer to like parts, in which:

FIG. 1 is a somewhat diagrammatic top plan view of railroad track including a switch and the track switch heater mounted adjacent the switch in accordance with the present invention;

FIG. 2 is a somewhat diagrammatic and fragmentary view of a portion of one of the track switch heaters shown in FIG. 1, with some parts broken away and other parts in section for purposes of clarity;

FIG. 3 is a view of the heater shown in FIG. 2 and taken substantially along line 3—3 thereof; and FIG. 4 is a transverse sectional view taken substantially along line 4—4 of FIG. 2.

Referring now to the drawings, and particularly to FIG. 1, railroad track is shown that includes track rails 10 mounted on track ties 11 defining a track 12 that is relatively straight and continuous. Track rails 13 mounted on track ties 14 define a track 15 that is associated with track 12 but extends from there as an alternative track. Movable track rail ends 13a coact with the track rails 10 of track 12 to define a switch for selectively causing railroad stock to move directly along track 12 or along track 15. Suitable switching mechanism 16 enables movement of the track rail ends 13a to cause spacing of same from the track rails 10 or to cause placement thereof directly against the track rails 10 for switching purposes.

In order to protect the track switch against malfuntioniang due to freezing ice and/or snow, a track switch heater 17 according to the present invention is suitably secured to the track ties 11 at one side of the track switch, and a track switch heater 18 according to the present invention is suitably secured to the track ties at the other side of the switch. The track switch heaters 17 and 18 are identical to each other and are independently operated as shown, but may be operated together as a single unit if so desired.

Referring now principally to FIGS. 2, 3 and 4, each track switch heater includes a control box 19, one or more precombustion chambers 20 (there being two precombustion chambers shown in the embodiment of the drawings), a fire tube 21 having one or more gas discharge nozzles 22, and a housing 23 surrounding the fire tube and nozzles defining therewith a plenum chamber 24 and having air nozzles 25 surrounding the gas nozzles 22. Fuel is supplied to the precombustion chamber 20 for mixing with primary combustion air and igniting to deliver combustion gases to the fire tube 21 for expelling through the nozzles 22. High velocity ambient air is supplied to the main duct 26 and from there to the branch ducts 27 that are connected to the plenum chambers 24 to deliver high velocity air to the plenum chamber 24 for expelling from the nozzles 25. The high velocity ambient air cools the fire tube 21 and mixes with and induces the ejection of gas from the nozzles 22 as the air is delivered from the nozzles 25. The high velocity ambient air also induces the introduction of the primary combustion air into openings 28 of the precombustion chamber housing to mix with the fuel and ignite to produce the hot gases for distribution into the fire tube 21 which is in effect an extension of the precombustion chamber housing 20.

Any number of air deflecting baffles 29 may be provided in the plenum chamber 24, whether mounted on the fire tube 21 or the housing 23, for the purpose of guiding the high velocity air within the plenum chamber and out the nozzles 25. It should also be appreciated that the baffles would be arranged depending upon the number of nozzles provided to effect substantially equal distribution of the high velocity air to all of the nozzles. The size of the nozzles may also vary in order to obtain substantially equal distribution of air and gas along a track rail. To further aid in the substantially equal distribution of the air, the shape of the plenum chamber housing 23 may also be formed to accomplish the desired results.

A blower of a suitable size, and as indicated by the numeral 30 is provided to deliver high velocity air to the main duct 26. Fuel is delivered to the control box from a suitable fuel tank 31 and conduit 32. A fuel nozzle 33 is provided within the control box and connected to the conduit 32 for delivering fuel to the precombustion chamber 20. One fuel nozzle would be provided for each of the precombustion chambers 20 where there is more than one precombustion chamber provided as in the example of FIG. 2. In order to ignite the fuel emitted from the fuel nozzle 33 a suitable igniter 34 is provided, and this may take the form of a spark plug which upon receipt of electrical power would cause a spark to ignite the fuel. Flame sensors 35 are also provided in the control box to detect the presence or absence of a flame and to control operation of a main valve in the conduit 32 leading to the fuel nozzles 33. Suitable electrical circuitry will be provided to enable coaction between the igniter, flame sensors and blowers to control the firing and shutting down of the heater. Initiation of the operation of the heater may be by local controls or remote controls or by a device sensing a condition necessitating the operation of the heater.

As seen in FIG. 1, each of the heaters 17 and 18 is provided with independently operable blowers and independent fuel tanks. If so desired, a common fuel tank and blower may be provided for a pair of heaters which coact together for keeping a switch clear of snow and ice. Inasmuch as the switch heaters are secured directly to the track ties, and not to the track rails, they may be easily removed for repair and/or storage in the summer season. Any type of fuel may be employed such as propane or natural gas.

In operation, actual ignition takes place just outside of the control box 19 in the precombustion chamber 20 and primary combustion air is induced into the precombustion chamber and fire tube 21 through the openings 28 by operation of the blower which drives air at high velocity through the plenum chamber 24 and the air nozzles 25. The very hot gases generated in the precombustion chamber flow along the inner pipe or fire tube 21 and are expelled through the gas nozzles 22 and against the track rails. The ambient air pumped through the plenum chamber 24 is in a sense cold air and serves to be heated by cooling the fire tube 21 and is expelled from the plenum chamber through the air nozzles 25 to mix with the combustion gases being discharged from the gas nozzles 22 and provide a high velocity mixture of combustion gases and air against the track rails. Expelling of the air from the air nozzles 25 induces movement of the gases and the introduction of primary combustion air into the precombustion chambers 20 through the openings 28. Essentially, the inner tube or fire tube 21 provides the heat, while the outer tube or plenum chamber housing 23 gives velocity to the heat wich will overcome any high wind conditions that might exist at the track rails. The heaters thereby cause sufficient heating of the track rails to keep them clear of ice and snow. Further, the heaters will effect evaporation of any water and maintain the track switches in a substantially dry condition. While the embodiment illustrated shows application to a single track arrangement, it should be appreciated that the length of the heater can be varied to suit the needs of the track and switch arrangements. Suitable shields are provided to prevent the burning of the track ties by the hot combustion gases that are expelled from the gas nozzles.

It will be understood that modifications and variations may be effected without departing from the scope of the novel concepts of the present invention, but it is understood that this application is to be limited only by the scope of the appended claims.

The invention is hereby claimed as follows:

1. A track switch heater adapted to be mounted on the track ties adjacent a track switch to apply heat to a track rail, said heater including a control box, a fuel nozzle in said control box, means for supplying fuel to said fuel nozzle, a precombustion chamber extending from said control box having air openings for introduction of primary combustion air therein, a fire tube extending from said precombustion chamber, a nozzle extending from said tube for directing hot gases against the track rail, a housing surrounding said fire tube and in spaced relation thereto and defining therewith a plenum chamber, means for supplying high velocity ambient air to said plenum chamber, and an air nozzle extending from said plenum chamber in surrounding relation to said gas nozzle to mix the air with said gases and induce the flow of primary combustion air into said precombustion chamber and the expelling of gases with the air at high velocity against the track rail.

2. A track switch heater as defined in claim 1, wherein said nozzles are shaped to provide a venturi effect.

3. A track switch heater as defined in claim 1, wherein baffles are provided in said plenum chamber to guide the flow of high velocity air to the nozzle.

4. A track switch heater as defined in claim 1, and a flame sensor in said control box for controlling flow of fuel to the fuel nozzle.

5. A track switch heater as defined in claim 1, and ignition means in said control box for igniting fuel at the fuel nozzle.

6. A track switch heater adapted to be mounted on the track ties adjacent a track switch to apply heat to a track rail, said heater including a control box, a fuel nozzle in said control box, means for supplying fuel to said fuel nozzle, a precombustion chamber extending from said control box having air openings for introduction of primary combustion air therein, a fire tube extending from said precombustion chamber, a plurality of spaced nozzles extending from said tube for directing hot gases against the track rail, a housing surrounding said fire tube and in spaced relation thereto and defining therewith a plenum chamber, means for supplying high velocity ambient air to said plenum chamber, and a plurality of corresponding air nozzles extending from said plenum chamber in surrounding relation to said gas nozzles to mix the air with said gases and induce the flow of primary combustion air into said precombustion chamber and the expelling of gases with the air at high velocity against the track rail.

7. A track switch heater as defined in claim 6, wherein said precombustion chamber and fire tube are tubular and said housing is correspondingly tubular.

8. A track switch heater as defined in claim 6, wherein said nozzles are sized proportionately so that a substantially equal volume of air is expelled from each air nozzle.

References Cited

UNITED STATES PATENTS

| | | |
|---|---|---|
| 1,803,358 | 5/1931 | Schumann. |
| 3,174,477 | 3/1965 | Wilson _____ 126—271.2 |
| 3,223,835 | 12/1965 | Cherry et al. ____ 126—271.2 X |

CHARLES J. MYHRE, *Primary Examiner.*